United States Patent
Bauer et al.

(10) Patent No.: US 7,808,987 B2
(45) Date of Patent: Oct. 5, 2010

(54) DISTRIBUTED SERVICES FOR MESH NETWORKS

(75) Inventors: Fred Bauer, Burlingame, CA (US); Fan Du, Campbell, CA (US)

(73) Assignee: SRI International, Menlo Park, CA (US)

( * ) Notice: Subject to any disclaimer, the term of this patent is extended or adjusted under 35 U.S.C. 154(b) by 509 days.

(21) Appl. No.: 11/612,777

(22) Filed: Dec. 19, 2006

(65) Prior Publication Data

US 2007/0140239 A1 Jun. 21, 2007

Related U.S. Application Data

(60) Provisional application No. 60/753,209, filed on Dec. 21, 2005.

(51) Int. Cl.
*H04L 12/28* (2006.01)

(52) U.S. Cl. .................................. 370/389; 709/217

(58) Field of Classification Search ................. 370/389, 370/406; 709/217, 223
See application file for complete search history.

(56) References Cited

U.S. PATENT DOCUMENTS

| 6,192,414 | B1 | 2/2001 | Horn | |
| 6,535,505 | B1* | 3/2003 | Hwang et al. | 370/352 |
| 6,711,147 | B1 | 3/2004 | Barnes et al. | |
| 6,789,125 | B1* | 9/2004 | Aviani et al. | 709/238 |
| 2002/0191250 | A1* | 12/2002 | Graves et al. | 359/128 |
| 2004/0210654 | A1 | 10/2004 | Hrastar | |
| 2005/0007964 | A1 | 1/2005 | Falco et al. | |
| 2005/0027778 | A1* | 2/2005 | Dimitrelis et al. | 709/200 |
| 2006/0126611 | A1* | 6/2006 | Kelly et al. | 370/389 |

OTHER PUBLICATIONS

Mockapetris, P., "Domain Names—Implementation and Specification", RFC 1035, Nov. 1987, 55 pages.
Mills, David L., "Network Time Protocol (Version 3)—Specification, Implementation and Analysis", RFC 1305, Mar. 1992, 113 pages.
Droms, R., "Dynamic Host Configuration Protocol", RFC 2131, Mar. 1997, 45 pages.
Clausen, T., et al., "Optimized Link State Routing Protocol (OSLR)", RFC 3626, Oct. 2003, 75 pages.
GuideWorks, "Registry Guide for Windows", Part of the WinGuides Network, last modified Jul. 19, 2002, 1 page.
De Couto, Douglas S., et al., "A High-Throughput Path Metric for Multi-Hop Wireless Routing", MobiCom '03, Sep. 14-19, 2003, San Diego, California, 13 pages.
Ogier, R., et al., Topology Dissemination Based on Reverse-Path Forwarding (TBRPF), RFC 3684, Feb. 2004, 46 pages.
Microsoft Corporation, "An explanation of the Automatic Metric feature for Internet Protocol routes", Article ID 299540, Last Review May 16, 2005, 2 pages.

* cited by examiner

*Primary Examiner*—Man Phan
*Assistant Examiner*—Wei Zhao
(74) *Attorney, Agent, or Firm*—Marger Johnson & McCollom, P.C.

(57) ABSTRACT

Nodes in a mesh network are configured to access centralized Internet Protocol (IP) services whenever the Internet infrastructure is accessible and then dynamically switch to providing the IP services locally in the mesh network when the Internet infrastructure is not accessible and operate through collaborative cooperation. In one embodiment, a Reported Node Time Server (RNTS) is elected when the mesh network is disconnected. In another embodiment, a Mesh Network Name Cache (MNNC) protocol pre-provisions each mesh node with the names and addresses of all other mesh nodes. In another embodiment, a Mesh Address Allocation Protocol (MAAP) provides DHCP services for DHCP clients in the mesh network.

11 Claims, 11 Drawing Sheets

DISCONNECTED WIRELESS MESH NETWORK

DISCONNECTED WIRELESS MESH
NETWORK SUPPORT FOR NTP SERVICES

CONNECTED WIRELESS MESH
NETWORK SUPPORT FOR NTP SERVICES

DISTRIBUTED SERVICES FOR MESH NETWORKS

PRIORITY

This application claims priority from co-pending provisional patent application Ser. No. 60/753,209 entitled: SUPPORTING DISTRIBUTED SERVICES IN WIRELESS MESH NETWORKS, filed Dec. 21, 2005 which is herein incorporated by reference in its entirety.

BACKGROUND

A wireless mesh network generally refers to a set of wireless devices, referred to as nodes, that join together to form an Internet Protocol (IP) based network. These wireless devices join together into a network capable of rudimentary connectivity. For example, nodes in the mesh network may choose unique IP addresses and configure their routing tables to allow for basic network connectivity. However, many well known IP-based applications rely on centralized IP services such as the Network Time Protocol (NTP), the Domain Name System (DNS), and the Dynamic Host Configuration Protocol (DHCP).

For example, nodes in a mesh network expect to use the Network Time Protocol (NTP) service to synchronize clocks with a known good clock. Other applications use the DNS Service to resolve node names such as "machine.company.com" into the appropriate IP address. Nodes also use the DHCP service to set IP addresses and other relevant network parameters.

These centralized IP services are not always available in a wireless mesh network. However, the mesh network should be able to support these IP-services when it operates in a stand-alone manner disconnected from the infrastructure. The present embodiments address this need and other problems with solutions that make use of collaborative cooperation between mesh nodes.

SUMMARY OF THE INVENTION

Nodes in a mesh network are configured to access centralized Internet Protocol (IP) services when the Internet infrastructure is accessible and then dynamically switch to providing the IP services locally in the mesh network when the Internet infrastructure is not accessible. In one embodiment, a Reported Node Time Server (RNTS) is elected when the mesh network is disconnected. In another embodiment, a Mesh Network Name Cache (MNNC) protocol pre-provisions each mesh node with the names and addresses of all other mesh nodes. In another embodiment, a Mesh Address Allocation Protocol (MAAP) provides DHCP services for DHCP clients in the mesh network.

The foregoing and other objects, features and advantages of the invention will become more readily apparent from the following detailed description of a preferred embodiment of the invention which proceeds with reference to the accompanying drawings.

DETAILED DESCRIPTION

Mesh Distributed Services (MDS) support any combination of different Internet Protocol (IP) services in a mesh network, that include, but are not limited to, the Network Time Protocol (NTP), the Domain Name System (DNS), and the Dynamic Host Configuration Protocol (DHCP). The MDS mimicks centralized Internet services through collaborative cooperation between individual mesh nodes.

Figure 1:
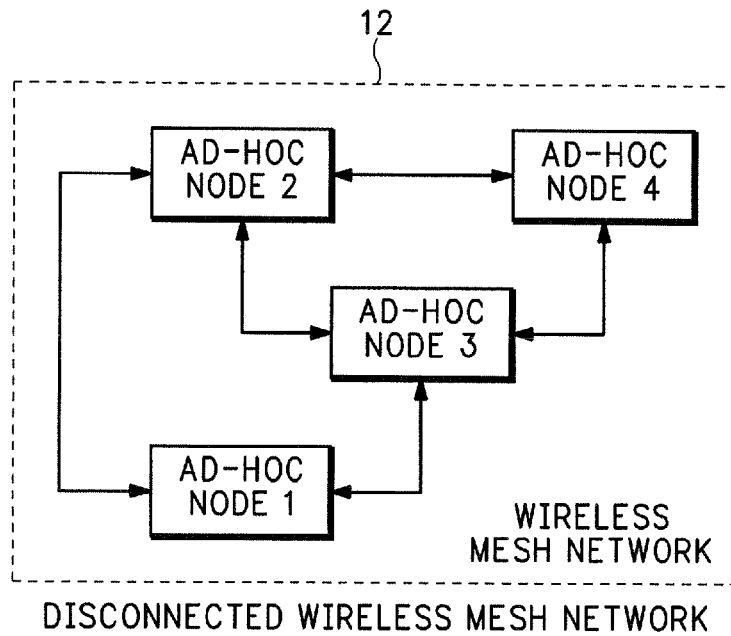
FIG. 1 shows a disconnected mesh network.

FIG. 1 shows a mesh network 12 that is currently disconnected from an Internet infrastructure. Nodes 1, 2, 3 and 4 are all computing devices that are capable of sending, receiving, and forwarding IP packets directly to other nodes. For example, the nodes 1-4 can be Personal Computers (PCs), Personal Digital Assistants (PDAs), cellular telephones with IP capabilities, digital pagers, or any other IP device that may need to operate in a mesh network.

Figure 2:
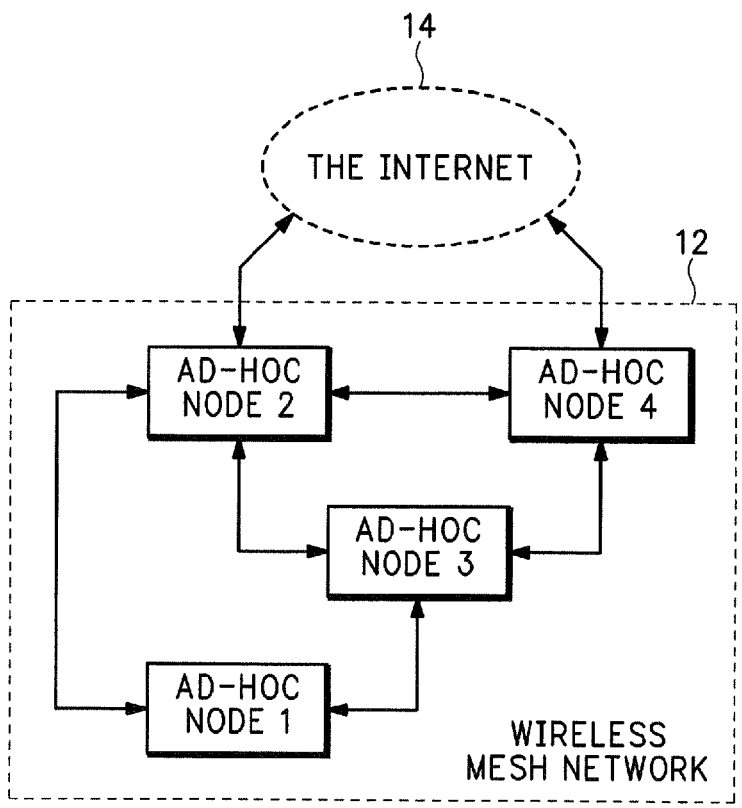
FIG. 2 shows a connected mesh network.

Any of nodes 1-4 may communicate directly with other nodes in the mesh network 12. Alternatively, the nodes 1-4 may communicate indirectly to other nodes through one or more intermediary nodes that relay the IP communications to the destination node. In FIG. 1, these communications are performed without any of the nodes 1-4 having access to an IP infrastructure. FIG. 2 shows the same wireless mesh network 12, now connected to an IP infrastructure 14.

FIGS. 1 and 2 demonstrate how the mesh network 12 over its lifetime may be connected or disconnected from the Internet 14. Whether permanently connected or disconnected to Internet 14, or whether intermittently connected to Internet 14 depends on the circumstances of the mesh network 12, such as the mobility and radio range of the different nodes 1-4. Given this constraint, the presence or absence of centralized IP services such as NTP, DNS, and DHCP are not guaranteed. The Mesh Distributed Services (MDS) described below allows the mesh network 12 to support a wide variety of IP applications both when connected and disconnected from the Internet 14.

Mesh nodes 1-4 know when they are part of a connected or disconnected mesh network 12 through the use of routing and data distribution software such as described in co-pending patent application, Ser. No. 60/543,352, filed Feb. 9, 2004, entitled: RELIABLE MESSAGE DISTRIBUTION IN AN AD-HOC MESH NETWORK (DDS); U.S. Pat. No. 6,845,091, entitled: TOPOLOGY DISSEMINATION BASED ON REVERSE-PATH FORWARDING (TBRPF); and IETF RFC 3626, entitled: OPTIMIZED LINK STATE ROUTING PROTOCOL (OLSR), T. Clausen and P. Jacquet, which are all herein incorporated by reference in their entirety.

These utilities allow nodes to determine their neighbors and peers in dynamically reconfiguring mesh networks. These previously described utilities also allow nodes to determine whether the mesh network they are currently part of is either connected to or disconnected from the Internet infrastructure. Accordingly, these mesh operations are not described in further detail.

Providing Network Time Protocol (NTP) Service

The Network Time Protocol (NTP) allows nodes in the Internet 14 to synchronize against one or more known good time clocks. The protocol as operated in the Internet is hierarchical in the sense that there are tiers of clocks organized by accuracy. For example, the Naval Observatory in Washington DC operates a primary NTP server providing a very accurate clock. The second tier of NTP clocks, known as secondary NTP servers, are synchronized against the primary NTP servers and serve the majority of NTP clients such as personal computers, routers, servers, and other network processing devices on the Internet 14.

The NTP clients are configured to periodically synchronize against a known NTP server to correct for clock drift. Nodes rely on one or more NTP servers to synchronize their clocks for a wide variety of uses. For example, an application may timestamp events using the local clock for comparison against similar events on nearby nodes in the mesh network 12.

Figure 3:
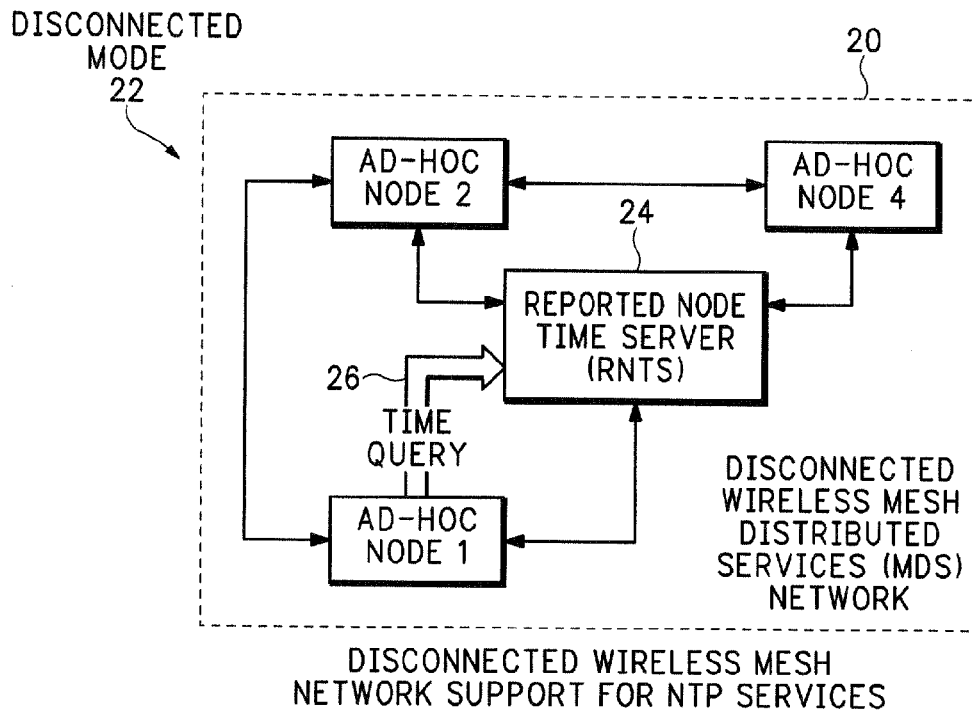
FIG. 3 shows how the disconnected mesh network supports Network Time Protocol (NTP) services.
Figure 4:
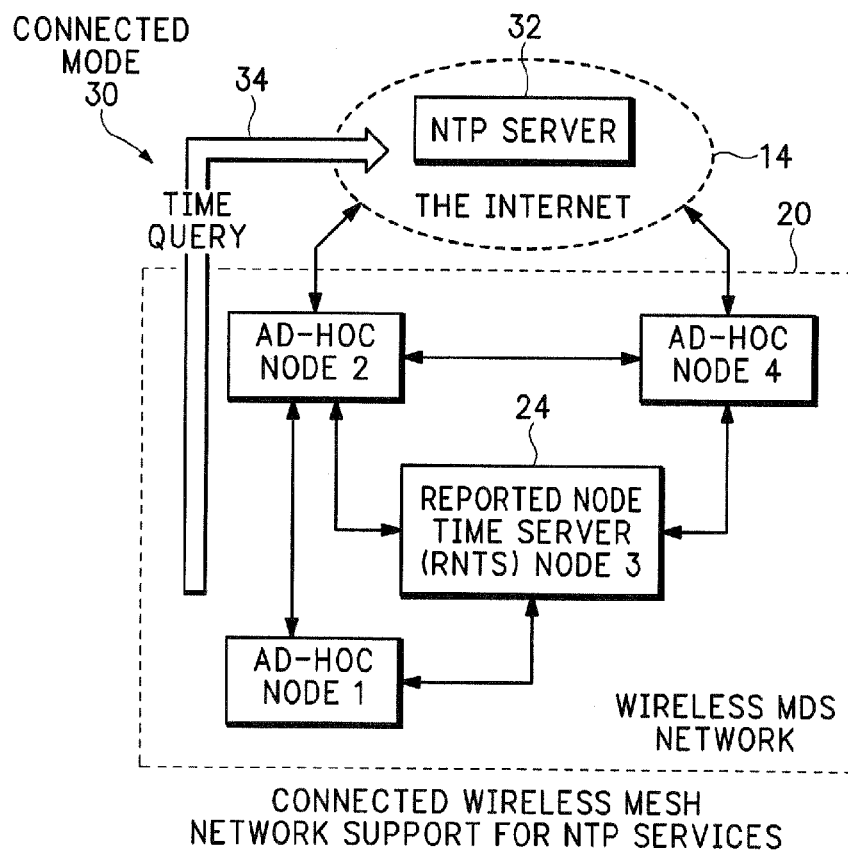
FIG. 4 shows how the connected mesh network supports NTP services.

FIG. 3 shows the Mesh Distributed Services (MDS) network 20 operating in a disconnected mode 22 and FIG. 4 shows the same MDS network 20 operating in a connected mode 30. The nodes 1-4 elect and synchronize against a local master time server when in the disconnected mode 22 shown in FIG. 3. Any of the nodes 1-4 can operate as the master time server, if elected. The nodes 1-4 can also synchronize against a central Internet NTP server 32 when in the connected mode 30 shown in FIG. 4.

The mesh nodes 1-4 determine if they are in the connected mode 30 or disconnected mode 22 by periodically sending time queries 34 to the NTP server 32 shown in FIG. 4. After a number of non-replies from NTP server 32, then nodes 1-4 assume the mesh network 20 is in the disconnected mode shown in FIG. 3.

Referring specifically to FIG. 3, when the mesh network 20 is disconnected from the Internet 14, the nodes 1-4 participate in an election of a master time server from amongst themselves. The elected node is alternatively referred to as a Reported Node Time Server (RNTS) 24. This election is possible since the mesh nodes 1-4 discover the mesh network topology through a proactive routing protocol such as TBRPF or OLSR as referred to above.

The RNTS 24 may be one or more of the nodes in the reported node set discovered using a proactive Mobile Ad-Hoc NETworking (MANET) routing protocol. One of the nodes may become a master and other nodes operates as hot standbys available should the master disappear. Node 3 is shown as the elected RNTS node 24 in FIG. 3. The other nodes 1, 2, and 4 are informed of the election and start sending time queries 26 to RNTS 24 when mesh network 20 is disconnected from Internet 14.

Proactive ad hoc network routing protocols generally track reported node sets in a network. A reported node set 24 allow RTNS to choose as its primary RTNS server, likely candidates nodes. A good candidate node is one that is closest to an equal number of hops from all network nodes, or "central". Each node in the reported node set 24 may be thought of as being "central" to the network 20, meaning it is a well-connected node within the mesh network 20. Thus, one or more RNTS nodes 24 are well placed to serve their mesh network neighbors 1, 2, and 4 as shown in FIG. 3.

Since the mesh network 20 dynamically changes over time, each node 1-4 should be prepared to operated as the RNTS 24 at any given time. Fortunately, running an NTP server on individual mesh network nodes 1-4, is straightforward since several implementations for NTP servers are available on a variety of operating systems and platforms. For example, Microsoft® Windows® XP/2000 includes an NTP server.

Referring again to FIG. 4, upon detecting that the mesh MDS network 20 is reconnected to Internet 14, each mesh network node 1-4 may choose to resynchronize with the publicly available NTP server 32 directly. For example, each of the nodes 1-4 may continue to periodically send time queries to NTP server 32, or send some other connection query to the Internet 14. If a reconnection to NTP server 32 is established, the nodes 1-4 may stop sending time queries 26 to the RNTS server 24 (FIG. 3) and dynamically start sending time queries 34 to the public NTP server 32. Each node 1-4 then compensates for clock drift that may have occurred while the mesh network 20 was disconnected from Internet 14 using the clock received back from NTP server 32.

Figure 5:
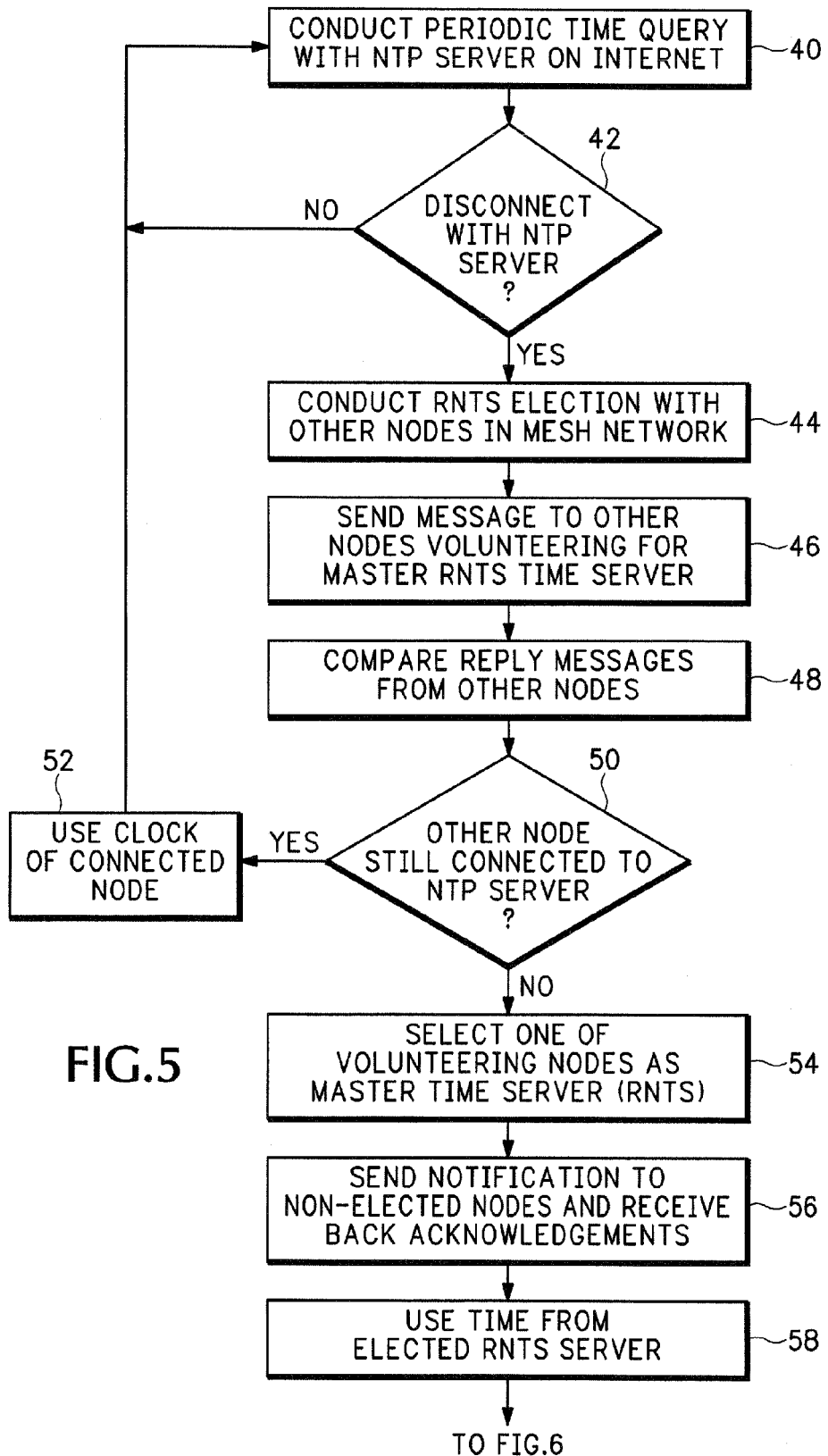
FIG. 5 shows in more detail how the mesh network supports the NTP services.

FIGS. 5-8 describe some of the MDS clock operations in more detail. Referring first to FIG. 5, in operation 40 any combination of nodes 1-4 in FIG. 4 periodically queries one or more of the NTP servers 32 in Internet 14 for clock updates. If there is no response from the NTP server 32 in operation 42, a Reported Node Time Servers (RNTS) election process is conducted between the nodes 1-4 in the mesh network 20 in operation 44.

There are many different ways that the election process could take place, but in one example, the nodes in operation 46 send messages to the other nodes volunteering to be the master time server (RTNS). The nodes compare the reply messages received from the other nodes in the mesh network 20 in operation 48.

Again, a variety of different criteria can then be used to decide which node will take over the role as RNTS 24 (FIG. 4). In one embodiment, operation 50 first determines if any of the other nodes in mesh network 20 are still actively communicating with a NTP server 32 in the Internet 14. In this case, one of the nodes replying to the election request may indicate that they are still in communication with one of the NTP servers 32 in the Internet 14. In this case, that connected node may be elected as the master time server in operation 52, or the other nodes may simply access the NTP server 32 in Internet 14 through the identified node.

If none of the nodes 1-4 indicate an active Internet NTP connection, then an election is conducted in operation 54 between all of the volunteering nodes. Any one of multiple criteria can be used to determine which node is elected as the RNTS 24. Some examples are described in more detail below in FIG. 7. The elected master time server 24 sends notifications to other volunteering nodes and the non-elected nodes send back acknowledgements in operation 56. In operation 58, the nodes 1-4 start using the elected RNTS node as the master clock server for updating their local clocks.

Figure 6:
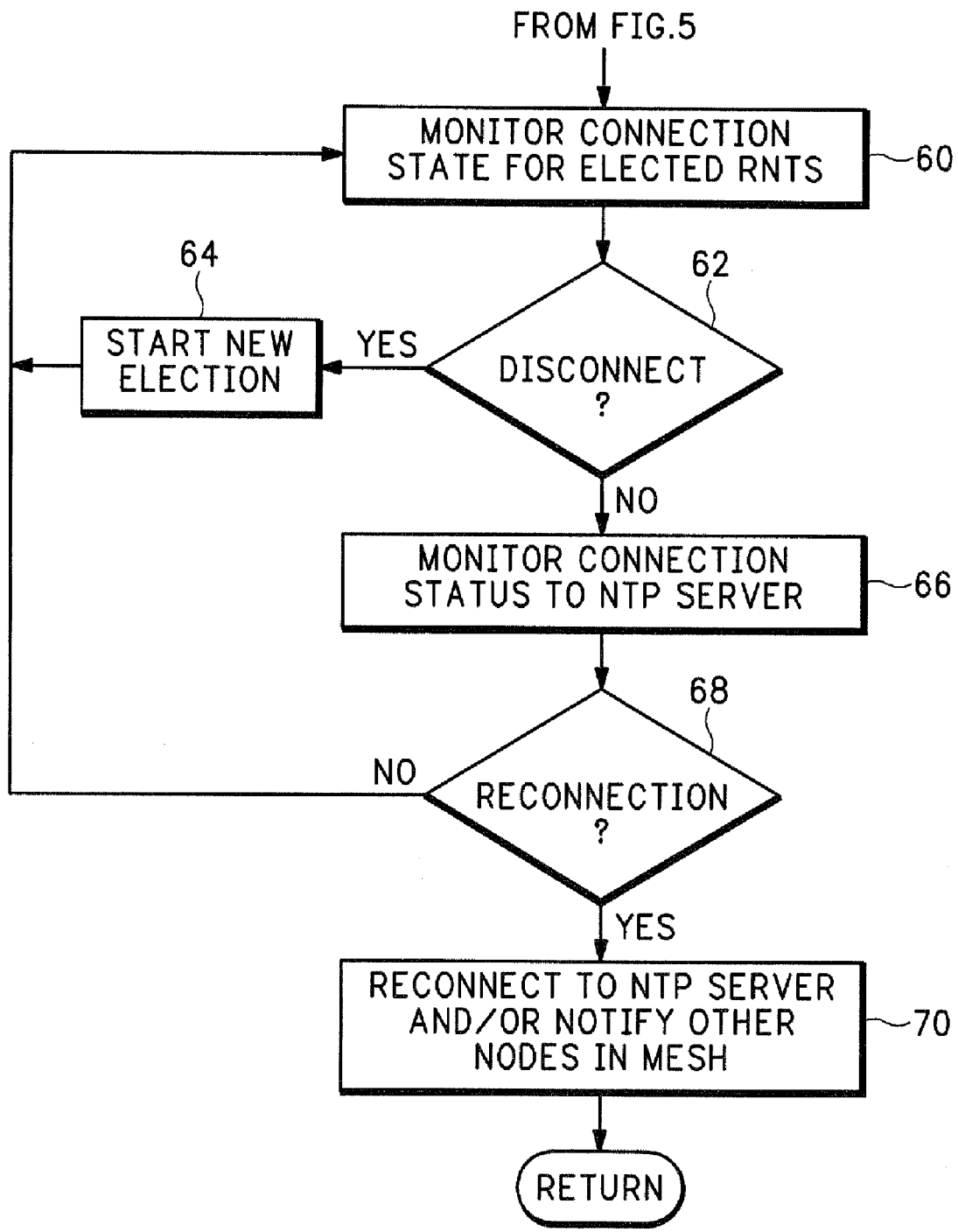
FIG. 6 shows additional detail of how the mesh network supports the NTP services.

FIG. 6 further explains MDS operations after one of the nodes 1-4 is elected as the RNTS 24. The nodes in operation 60 monitor the connection status with the elected RNTS 24, For example, a node may become disconnected from the RNTS 24 in operation 62. This could happen when the node moves out of wireless communication range with the elected RNTS 24 or any of the other nodes in the same mesh network 20. If a disconnection is detected, the disconnected node may start a new election process with other nodes maintaining wireless mesh communication in operation 64.

The node in operation 66 may also periodically monitor connection status with any NTP servers 32 in the Internet 14. The node in operation 68 may reestablish communication either through another mesh node or directly with an access point that communicates with Internet 14. In this case, the node may reconnect to the Internet NTP server 32 in operation 70. The node may also notify other nodes in the mesh network 20 in operation 70 that communication has been reestablished with the NTP server 32. This may trigger a new election process or cause the connected node or some other central node to distribute clock information from NTP server 32 to other nodes in the mesh network 20.

Figure 7:
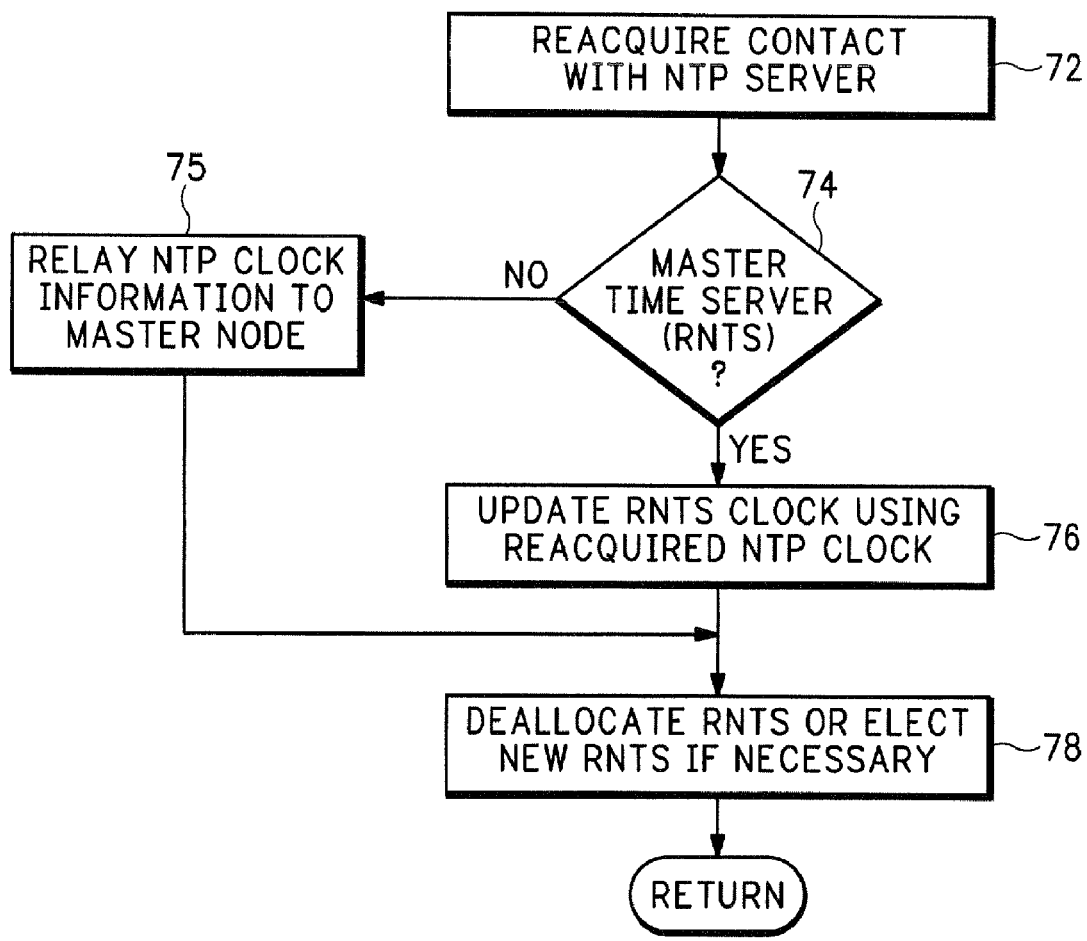
FIG. 7 shows how the mesh network reacquires an NTP service from the Internet.

FIG. 7 describes in more detail some of the operations performed by a mesh node when communication is reestablished with an Internet NTP server 32 in operation 72. The connecting node may be the designated master time server that previously won election as RNTS. Otherwise the connecting node could be one of the other nodes that currently is sending time queries to the RNTS node 24. If the node reacquiring contact with the NTP server 32 is also the master RNTS node 24 in operation 74, then the current time may be updated with the clock information from the reacquired NTP server 32 in operation 76.

Otherwise the node reacquiring contact with the NTP server 32 may relay the NTP clock information to the master node 24 in operation 75. For example, the node reconnecting to the Internet may not be centrally located with respect to all of the other nodes 1-4 in the mesh network 20. In this case, it may be more efficient for the reconnecting node to relay the clock information from the NTP server 32 to the current master node in mesh network 24. For example, node 2 in FIG. 4 may forward the NTP clock information to the central master time server 24. Other nodes in mesh network 20 may then be able to more efficiently update their clocks from the RNTS node 24 instead of having to hop across multiple intermediary nodes to obtain clock information from the reconnecting node.

In operation 78, the MDS network 20 may then deallocate the RNTS node 24 or elect a new RNTS node 24 if necessary. For example, as described above, the node reconnecting to the Internet 14 may be relatively central to the other nodes in mesh network 20. In this case, the connecting node may take over as the master time node for supplying the clock information to other nodes in the mesh network 20. After connection to the NTP server 32 for some period of time, the RNTS node may be de-allocated altogether. Nodes in mesh network 20 would then acquire their clocks from the NTP server 14, either directly, or indirectly through another mesh node.

Figure 8:
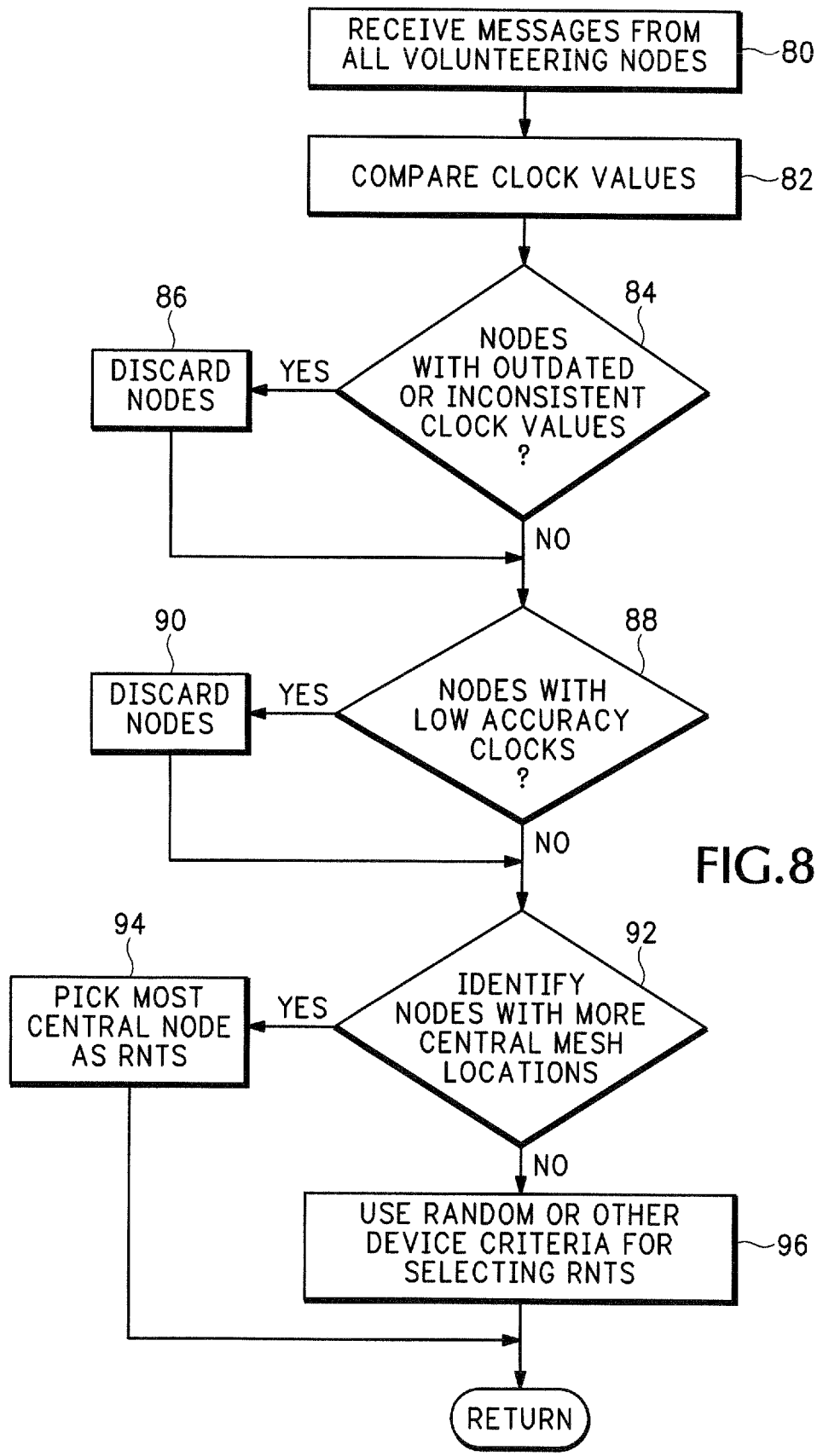
FIG. 8 shows how nodes in the mesh network elect a master time server.

FIG. 8 describes some of the different factors that may be considered during the election process for deciding which of the nodes in mesh network 20 operates as the RNTS 24. A node in operation 80 receives messages from all volunteering nodes. In one possible embodiment, the messages may also include the last current clock value supplied by each of the different volunteering mesh nodes. Nodes having clock values outside of some normal deviation in operation 84 may be discarded in operation 86. For example, five nodes may all have clock values within a second or two, and one node may have a clock value that is from two days earlier. The node with the earlier clock value may be discarded from the election process in operation 86.

In another embodiment, the messages sent by the nodes may include a clock accuracy field in operation 88. For example, one or more nodes may also receive a clock associated with an attached Global Positioning Satellite System (GPS). Other nodes may only have a local clock operated by a processor and have no alternative external clock access. Any devices that have access to more accurate clocks may be identified in operation 88 and the other nodes with lower accuracy clocks may be discarded from the election process in operation 90.

In yet another embodiment, mesh topology information may be considered in operation 92. As explained above, it may be more convenient and efficient for a particular node with a more central mesh location to operate as the RNTS 24. This would possibly reduce the overall number of hops each of the nodes has to travel to obtain time information from the elected RNTS node 24. Identifying the central nodes in a mesh network is described in the DDS, TBRPF, and OLSR references mentioned above. Nodes with relatively central mesh locations may be identified in operation 92 and one of the identified nodes selected as the RNTS node 24 in operation 94.

Otherwise, other criteria or a random selection process may be used to elect any of the remaining nodes as the RNTS node 24 in operation 96. For example, the remaining node with the highest processing capacity may be selected as the RNTS 24 in operation 96, or the node with the most recent reported clock time may be selected. Alternatively, the RNTS node 24 may be selected randomly or semi-randomly based on node IP addresses.

It should also be understood any of the operations or mesh states described above may be initiated and reevaluated according to the dynamics of the mesh network 20. For example, a new mesh network including only nodes 1 and 2 may be established when those two nodes move out of wireless communication with nodes 3 and 4. In this case, the two nodes 1 and 2 may still not be connected to the Internet 14 and neither of nodes 1 and 2 may currently be elected as a RNTS master clock server 24. Accordingly, a new election is initiated between nodes 1 and 2 to determine which will operate as RNTS 24.

The two nodes 1 and 2, when forming a new mesh network, may alternatively reestablish communication with Internet infrastructure 14. Accordingly, nodes 1 and 2 can forgo the RNTS election process and synchronize with Internet NTP server 32. At the same time, the other two nodes 3 and 4, may still be operating in a disconnected mode with node 3 maintaining operation as the RNTS 24.

Providing Domain Name System (DNS) Service

A conventional Domain Naming Service (DNS) is a hierarchy of name servers which resolve human readable names such as "machine.company.com" into Internet Protocol (IP) addresses. Each DNS server attempts to resolve a name into its equivalent IP address, passing the name upwards to a parent name server when the name cannot be resolved locally. When a mesh network is disconnected from the Internet, no DNS server may be available to resolve names for mesh network addresses. DNS servers can be disconnected from individual mesh nodes at any given time due to the ad-hoc nature of mesh networks.

Figure 9:
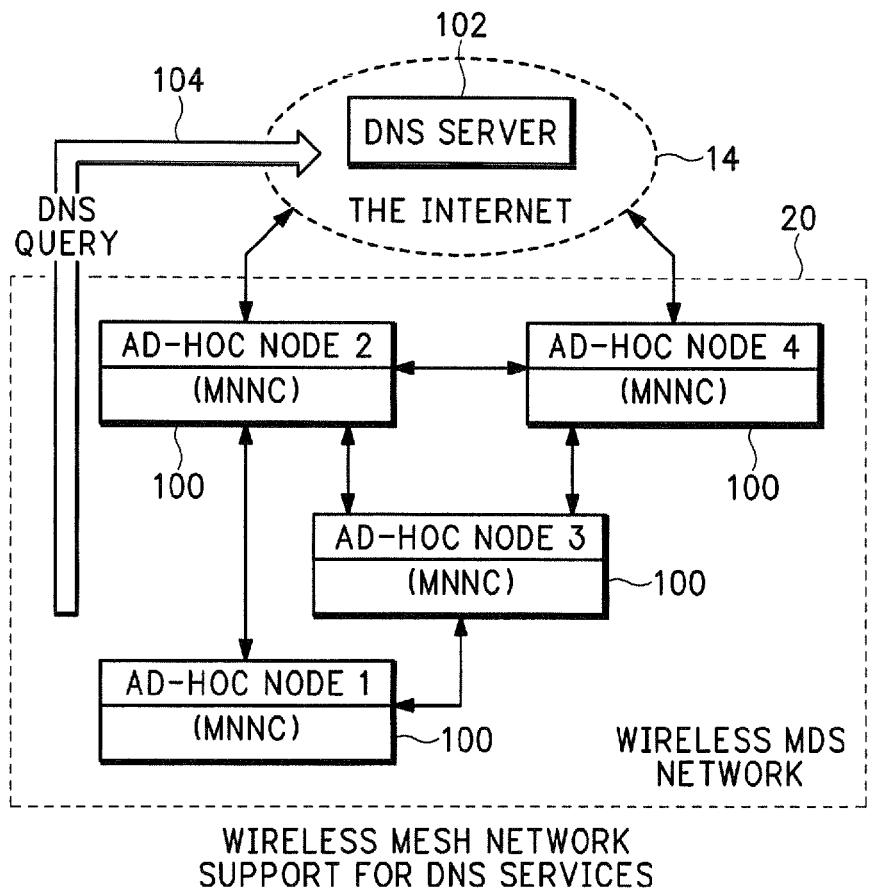
FIG. 9 shows how the mesh network supports Domain Name System (DNS) services.

Referring to FIG. 9, to overcome these restrictions, each node 1-4 in the MDS network 20 can operate a cache that is pre-provisioned with the names and addresses of all mesh nodes and is referred to as the Mesh Node Name Cache (MNNC) protocol 100. Unlike a DNS cache, the MNNC protocol 100 returns DNS query results only for mesh nodes, passing along other DNS queries to a DNS server 102 if the mesh network 20 is connected to Internet 14.

Each mesh node 1-4 pre-provisions its MNNC 100 with the names and addresses of all other mesh nodes learned through mesh network data distribution. For example, as described in co-pending U.S. application Ser. No. 60/543,352, filed Feb. 9, 2004, entitled: RELIABLE MESSAGE DISTRIBUTION IN AN AD-HOC MESH NETWORK, which is herein incorporated by reference. All other DNS queries are passed onwards to a higher-level DNS server 102, if available.

Providing Dynamic Host Configuration Protocol (DHCP) Service in a Wireless Mesh

The Dynamic Host Configuration Protocol (DHCP) allocates network configuration parameters such as IP address, network mask, and default routes via a series of queries and responses between DHCP client and server. When a DHCP client first arrives in a network, it queries for nearby DHCP servers. These queries may be answered by nearby DHCP servers or may be relayed onwards to DHCP servers further away. A DHCP client chooses among the responses received from servers to complete its network configuration.

Figure 10:
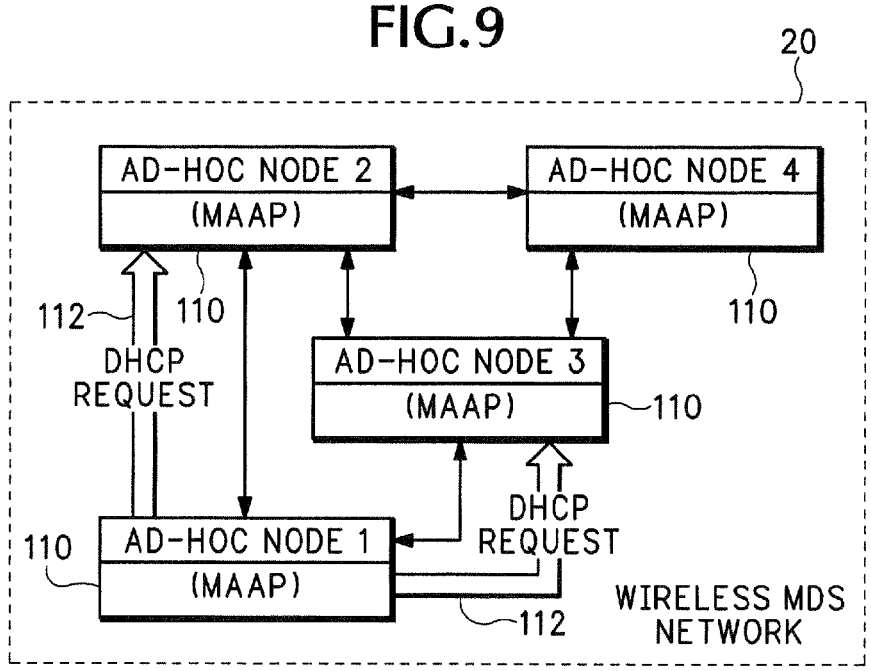
FIG. 10 shows how a disconnected mesh network supports Dynamic Host Configuration Protocol (DHCP) services.
Figure 11:
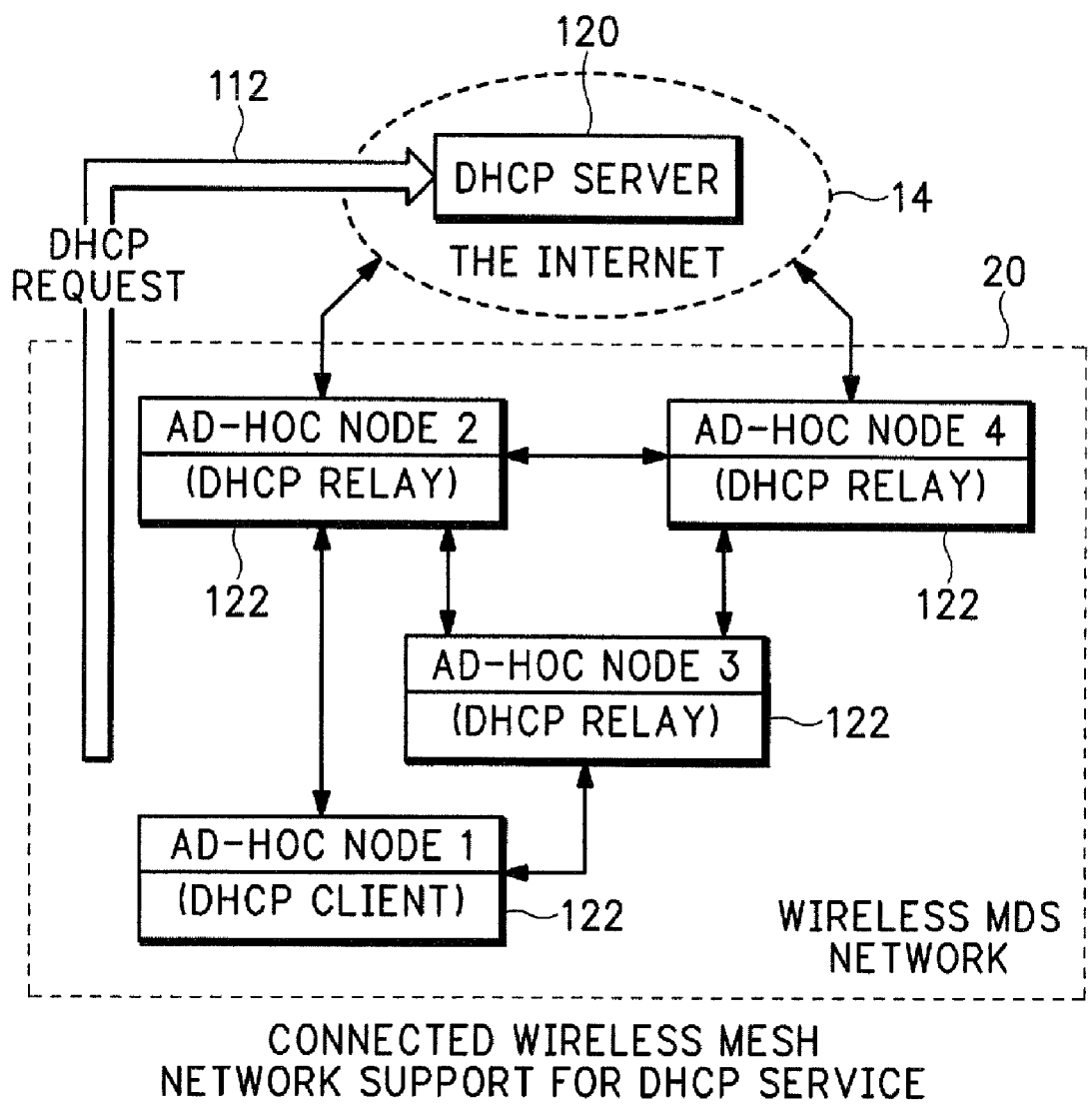
FIG. 11 shows how a connected mesh network supports DHCP services.

FIG. 10 shows a node 1 just entering the mesh network 20. Node 1 operates as a DHCP client unable to connect to a conventional DHCP server 120 (FIG. 11). Instead, the other mesh nodes 2-4 act as DHCP servers, responding to DHCP client requests 112 from node I after entering the mesh network 20. This DHCP service on each mesh node is referred to as the Mesh Address Allocation Protocol (MAAP) 110. One consideration in MAAP is avoiding collisions with IP address assignments. MAAP servers communicate allocated addresses through the mesh network data distribution described in the '352 application.

Even with this data distribution, IP address collisions may occur since IP addresses are disseminated to all mesh network nodes. IP address allocation conflicts are detected at each mesh node via a proactive routing protocol such as described in U.S. Pat. No. 6,845,091 and IETF RFC 3626. When an address collision is detected, a neighboring node drops the connection with one of the offending nodes, forcing a reconnection through a new DHCP request.

FIG. 11 shows the mesh network 20 reconnected to the DHCP server 120 in the Internet 14. In this connected state, the mesh nodes 1-4 each detect reconnection to the Internet 14. The mesh nodes 2-4 then change behavior, acting as DHCP relays 122 for forwarding DHCP requests 112 to DHCP server 120 in the Internet 14. Thus, the mesh nodes operate as a MAAP DHCP server 110 when the mesh network 20 is disconnected from the Internet 14 and then dynamically changes to operating as a DHCP relay 122 when the mesh network 20 reconnects to the Internet 14.

Figure 12:
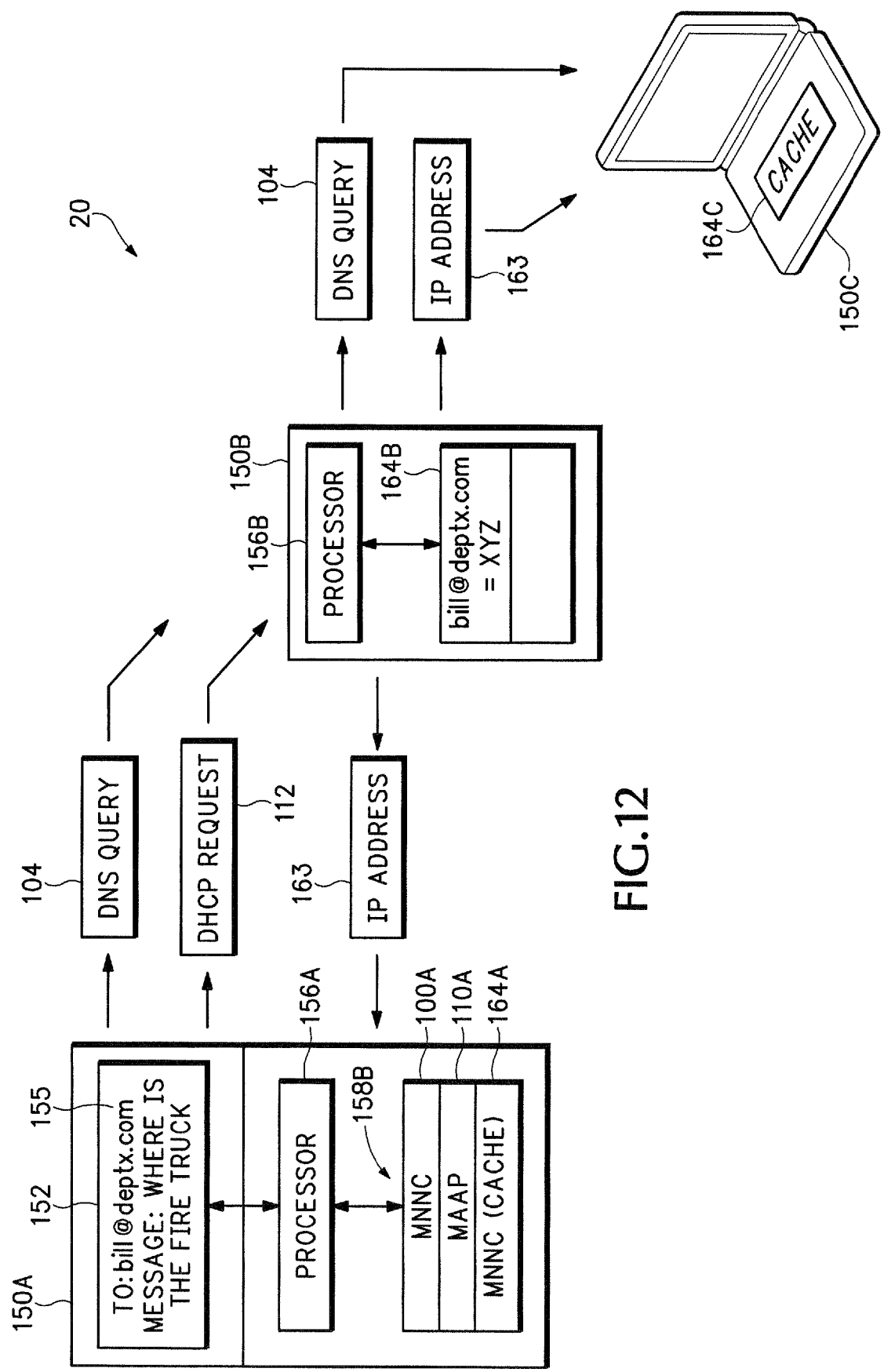
FIG. 12 shows how a DNS cache is used by nodes in the mesh network.

FIG. 12 describes in more detail some of the distributed DNS and DHCP services. Nodes 150A, 150B, 150C are part of mesh network 20. Each node typically includes a screen or display 152 that displays a user interface 155 for interacting with different software applications. In this example, the user interface 155 is for an email application. The mesh nodes 150 also each include a processor 156 for operating code for both the MNNC protocol 100 and MAAP 110 that is stored locally in memory 158. The processor 156 can also operate the RTNS described above. Each node 150 also includes a cache 164 storing different DNS mappings and other DHCP information.

Figures 13, 14:
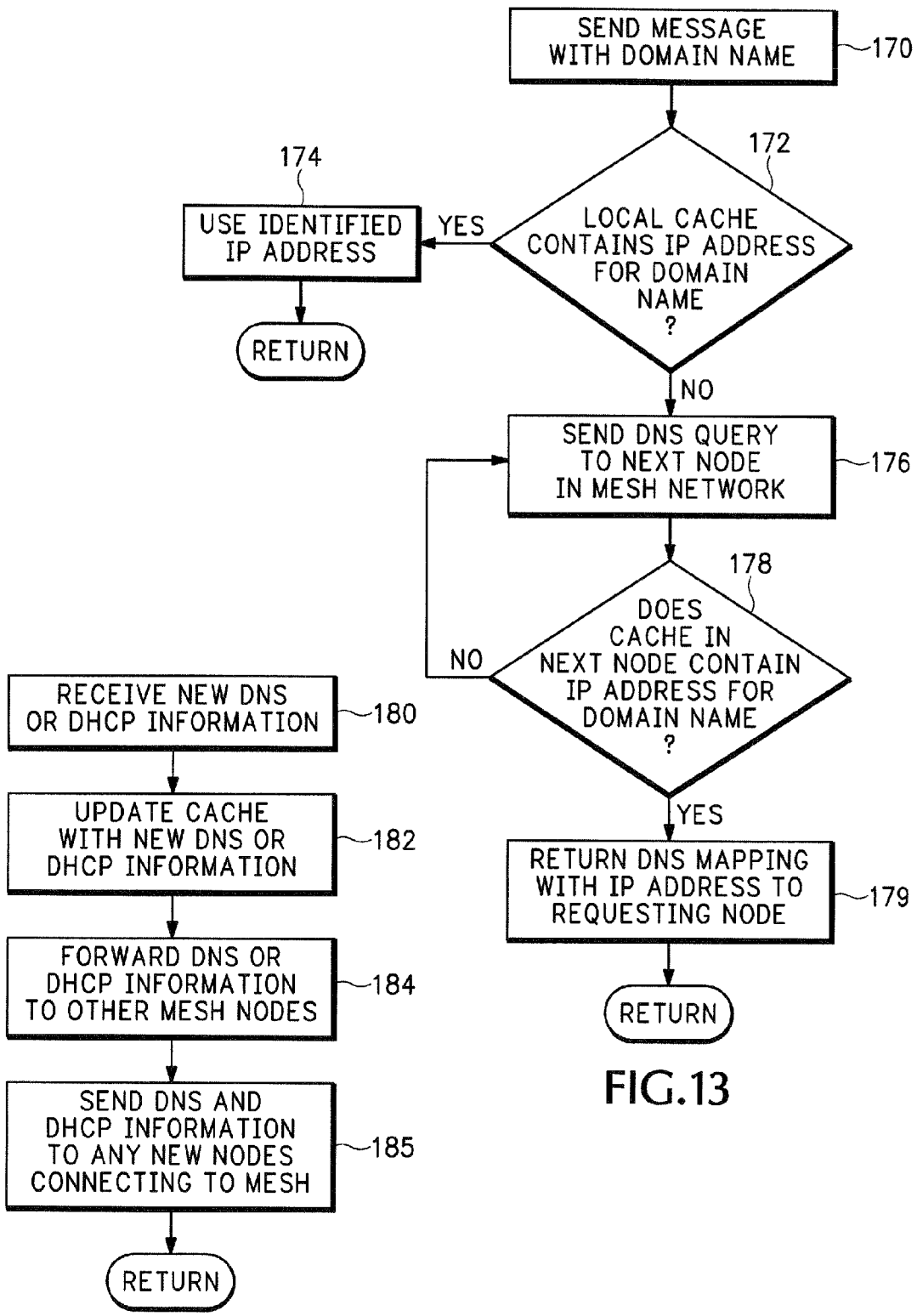
FIG. 13 shows how the nodes in the mesh network query other nodes for DNS mappings.
FIG. 14 shows how the nodes in the mesh network update DNS and DHCP information.

Referring to both FIG. 12 and FIG. 13, in operation 170 of FIG. 13, one of the nodes 150 sends a message, packets, data, etc., that is associated with a particular domain name. For example, a user on node 150A in FIG. 12 may want to send an email message created on user interface 155 to another user having the internet name "bill@deptx.com". The node 150A in operation 172 first checks DNS mappings in local cache 164A for an associated IP address. If the local cache 164A contains the IP address for bill@deptx.com, then that identified IP address is used as the destination address for the packets carrying the email message in operation 174.

If the local cache 164A does not contain the IP address mapping for bill@deptx.com, then the MNNC protocol 100A operating in mesh node 150A sends a DNS query 104 to the next node in the mesh network 20 in operation 176. The DNS query 104 includes the name bill@deptx.com. In the example shown in FIG. 12, node 150A sends the DNS query 104 to node 150B.

The MNNC protocol running on node 150B then checks local cache 164B for the requested DNS mapping. If cache 164B contains the IP address for domain name bill@deptx.com, the associated DNS mapping is sent back to node 150A in operation 179. If cache 164B does not contain requested DNS mapping, then node 150B in operation 178 forwards the DNS query 104 to a next node 150C in operation 176. The MNNC protocol operating in node 150C then checks local cache 164C for the name-IP address mapping associated with DNS query 104. This DNS query progresses through the nodes of the mesh network 20 until the DNS mapping is located.

This DNS caching scheme also provides DNS acceleration. The caches 164 are constantly updated with DNS information. Therefore, when communicating locally in the mesh network 20, the mesh nodes 150 can bypass centralized DNS servers 102 and use the information in caches 164, even when the mesh network 20 is connected to Internet 14.

FIG. 14 describes how the mesh nodes are automatically updated with DNS and DHCP information. In operation 180, one of the nodes may receive new DNS mappings or new DHCP information. For example, the node 150A may receive new DNS or DHCP information from another node in the mesh network 20. In operation 182, the node 150 updates the local cache 164 with the updated DNS or DHCP information. The node 150 in operation 184 then forwards the new DNS or DHCP information to other nodes in the mesh network 20. Operation 185 may automatically send the DNS and DHCP information in cache 164 to nodes when first connecting to mesh network 20.

Figure 15:
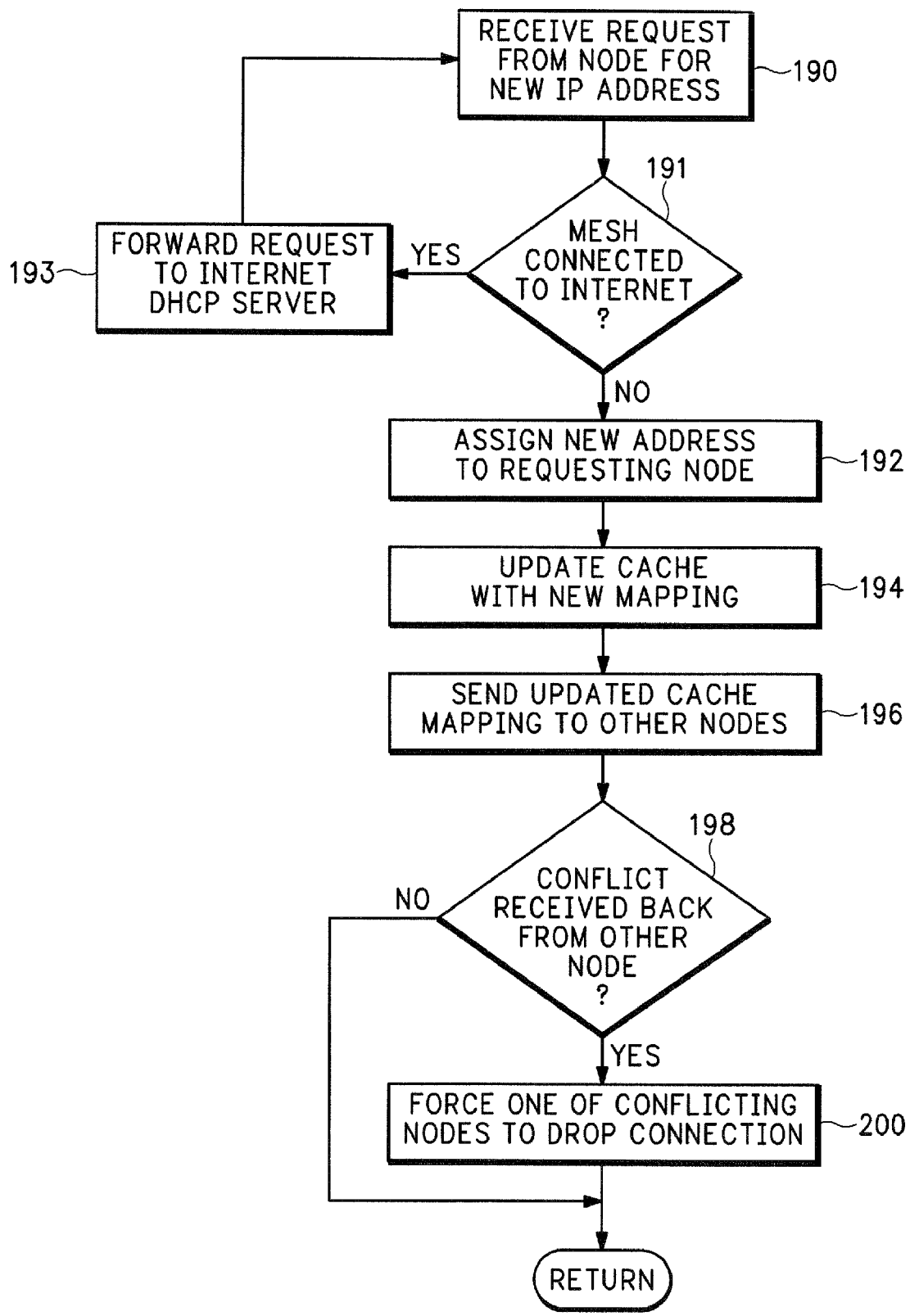
FIG. 15 shows how the mesh network handles IP address conflicts.

FIG. 15 describes in more detail some operations performed by the MAAP 110 in the mesh nodes 150. Referring to both FIG. 12 and FIG. 15, a node 150 receives a DHCP request 112 for a new IP address in operation 190. For example, a node may need a valid IP address when first connecting to the mesh network 20. The node 150B receiving the DHCP IP address request 112 may first determine if the mesh network 20 is currently connected to the Internet in operation 191. If so, the node may forward the DHCP request 112 to the DHCP server 120 in Internet 14 (FIG. 11). Otherwise, the node receiving the request 112 assigns a new IP address 163 to the requesting node in operation 192. The node 150B assigning the new IP address 163 then updates cache 164B with the new DNS mapping in operation 194.

The same assigning node can then send the updated mapping to other nodes in the mesh network in operation 196 that includes the new IP address 163 for the new node. There is a chance one of the other nodes in the mesh network was already assigned the same IP address. The mesh nodes 150 in operation 198 compares the newly assigned IP address with existing IP addresses already assigned to other nodes. If there are conflicts, one of the nodes assigned the same IP address is forced to disconnect and then reconnect to the mesh network 20 in operation 200. This automatically reinitiates the IP address assignment operations described above. The node will then be assigned a new IP address that hopefully does not conflict with previously assigned IP addresses. If so, the node may be disconnected and forced to reconnect again to the mesh network 20.

Any arbitration or election process can be used to determine which of the nodes assigned the same IP address has to disconnect and reconnect. For example, any of the factors described above for electing a master time clock node can be used. Alternatively, the last node to be assigned the conflicting IP address may be forced to reconnect. Other arbitration schemes can similarly be used.

It is also noted that any of the forwarding, updating, and master assignment operations described above can be used in conjunction and interchangeably with any of the RNTS, DNS or DHCP operations described above.

CONCLUSION

The Mesh Distributed Services (MDS) scheme supports different IP services including the Network Time Protocol (NTP), the Domain Name System (DNS), and the Dynamic Host Configuration Protocol (DHCP). Each of these services mimic some of the operations of a centralized counterpart when the mesh network is disconnected from the Internet and may defer to the centralized equivalent when the mesh network is connected to the Internet. However, the MDS scheme is not limited to centralized NTP, DNS, and DHCP services and can be used for any IP services that are distributed to different network devices and can also be used in conjunction with other centralized non-mesh network Internet services.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A node in a wireless mesh network, comprising:
   a memory configured to store code for a Mesh Address Allocation Protocol (MAAP) and code for a Mesh Network Name Cache (MNNC) protocol;
   a display configured to display a user interface for interacting with at least one software application; and
   a processor configured to operate the at least one software application, to operate the code for the MAAP and the code for the MNNC protocol, to access centralized Internet Protocol (IP) operational services in an Internet infrastructure, to dynamically switch to providing similar IP operational services to at least one other node in the wireless mesh network as soon as the wireless mesh network becomes disconnected from the Internet infrastructure, and to continue providing the similar IP operational services as long as the wireless mesh network remains disconnected from the Internet infrastructure.

2. The node according to claim 1 wherein the IP operational services provided by the processor comprise at least one of a Network Time Protocol (NTP) service and a Domain Name System (DNS) service.

3. The node according to claim 1 wherein the processor is further configured to automatically relay time or IP address information for the IP operational services to the other nodes in the mesh network that also dynamically switch to providing the IP operational services when the mesh network is disconnected from the Internet infrastructure.

4. The node according to claim 1 wherein the processor participates in an election process for operating as a master clock server for other nodes in the mesh network when the mesh network does not have access to a Network Time Protocol (NTP) server in the Internet infrastructure.

5. The node according to claim 4 wherein the election process dynamically selects one of the nodes in the mesh network as the master clock server according to how central the nodes are to the other nodes in the mesh network.

6. The node according to claim 4 wherein the election process dynamically selects one of the nodes in the mesh network as the master clock server according to clock times reported by the nodes or according to what alternative access the nodes have to other clock references.

7. The node according to claim 4 wherein the processor dynamically switches from using the elected master clock server in the mesh network to using the NTP server when the mesh network reconnects to the Internet infrastructure.

8. The node according to claim 1 wherein the processor is further configured to dynamically start operating the MAAP or the MNNC protocol whenever the wireless mesh network cannot communicate with an Internet DNS server or Internet DHCP sever, respectively, in the Internet infrastructure, wherein the processor is also configured to dynamically switch back to using the Internet DNS server or Internet DHCP server when the wireless mesh network reestablishes communication with the Internet infrastructure.

9. The node according to claim 8 wherein the processor is configured to receive a DNS or DHCP request from another node in the mesh network and reply with any DNS or DHCP information in a cache associated with the DNS or DHCP request, the processor further configured to forward the DNS or DHCP request to a next node in the mesh network when the cache does not contain information responsive to the DNS or DHCP request.

10. The node according to claim 9 wherein the processor is configured to assign a new IP address to a new node entering the mesh network, update the cache with a new DNS mapping including the new IP address, and then forward the cache updates to other nodes in the mesh network.

11. The node according to claim 10 wherein the processor drops a connection with the new node when the new IP address conflicts with an existing IP address assigned to another node causing the new node to reconnect to the mesh network for assignment of another new IP address.

* * * * *